United States Patent
Hoffman et al.

[11] 3,812,712
[45] May 28, 1974

[54] WIND DIRECTION MONITOR SCALE CONVERTER

[75] Inventors: Philip A. Hoffman; Frederick K. Davey, both of Baltimore, Md.

[73] Assignee: The Bendix Corporation, Southfield, Mich.

[22] Filed: Apr. 9, 1973

[21] Appl. No.: 349,136

[52] U.S. Cl............. 73/188, 340/177 VA, 340/271
[51] Int. Cl............................................ G01f 13/02
[58] Field of Search........ 73/188, 189; 340/177 VA, 340/271, 282

[56] References Cited
UNITED STATES PATENTS
3,678,485   7/1972   Jones............................... 73/188 X
3,690,170   9/1972   Lane.................................... 73/188

*Primary Examiner*—Jerry W. Myracle
*Attorney, Agent, or Firm*—W. G. Christoforo; Bruce L. Lamb

[57] ABSTRACT

A wind vane drives a movable contact of a voltage divider comprised of a 360° potentiometer. The movable contact is connected into a voltage summing point in an electrical circuit which responds to a discontinuity in the potentiometer output to add or subtract a voltage at the summing point to compensate for the discontinuity. In addition, at one end of the electrical range of the circuit a voltage equivalent to 360° of vane rotation is provided at the summing point to reposition the electrical sum to a value intermediate of its range, while the potentiometer discontinuity is arranged to occur at the other end of the electrical range of the circuit.

9 Claims, 2 Drawing Figures

PATENTED MAY 28 1974　　　　　　　　　　　　　　　3,812,712

WIND DIRECTION MONITOR SCALE CONVERTER

BACKGROUND OF THE INVENTION

This invention relates to means for monitoring the rotational position of a shaft and more particularly relates to such a system where the shaft drives a rotary electrical output device having a range from 0° to 360° and having a discontinuity at the 0°, 360° point. The invention generally eliminates the problems associated with the aforementioned discontinuity when recording the shaft position on a strip chart.

The present invention has particular use in wind direction recording apparatus of the type employing an electrical means having a continuous range for generating an output signal correlated to wind vane position such as a linear single turn potentiometer having a movable tap or slider drivenly connected to the wind vane and where additionally the output signal, for example, the movable tap is electrically connected to position a stylus on a moving tape in accordance with the angular position of the wind vane. When wind direction data is sensed by such an electrical means problems are encountered in trying to display the information on an analog meter. One end of the meter scale normally represents 0° while the other end represents 360°. Now, as the wind direction fluctuates about 0° the meter continually switches from one end the scale to the other and back again. If the meter comprises a strip chart recorder, the stylus thereof will move back and forth across the paper generally obscuring the record.

This problem has been solved in the past by calibrating the strip chart with standard calibration lines for a wind direction of 000° through 360° and with additional calibration lines through a successive 180°. When the stylus now reached the limits of its range it was displaced 360° back towards the center of the chart. In this manner the stylus continued to indicate the actual direction of the wind vane more centrally of its total range.

One means for effecting this repositioning of the stylus has been, in the prior art, two, single turn 360° potentiometers driven in common by a wind vane and having the discontinuities displaced by 180°. Switching circuitry responding to the angular position of the wind vane selected the proper potentiometer to drive a direction indicator.

Other prior art means for effecting repositioning of the stylus have involved means for shifting the electrical potential impressed across a potentiometer.

Another prior art means involves the use of single turn linear potentiometer where the potentiometer discontinuity occurs at two stylus positions within the range of stylus. Logic circuitry is provided which senses the occurrence of a discontinuity to supply a current or withdraw a current, from a current summing point, in a direction to compensate for the discontinuity. In addition, the logic circuitry detects when the stylus reaches either of its extremes to add or withdraw current from the summing point to reposition the stylus 360° to a more central area of its range.

SUMMARY OF THE INVENTION

The present invention is a scale converter which makes use of a single potentiometer or equivalent device and associated switching circuitry to reposition the stylus on a wind direction indicator or monitor by 360° when the limits of the range of the monitor are reached. The range of the monitor has been expanded in accordance with the prior art to be greater than 360°. In the embodiments shown the movable contact or tap of a voltage divider comprised of a 360° linear single turn potentiometer is ganged to a wind vane. This type of potentiometer has a discontinuity at the cross-over point normally correlated as between 0° and 360°. Since the range of the monitor is greater than 360°, the discontinuity will correspond to at least two positions of the stylus. The potentiometer is arranged so that one such position will be at one extreme of the stylus range. The movable contact is connected to an electrical summing point in an electrical circuit. When the contact moves, the resultant voltage at the summing point changes linearly. When the contact moves across the discontinuity, the voltage would normally change abruptly. However, the electrical circuit responds when the movable contact moves across the discontinuity to add or subtract a voltage quantity equivalent to 360° vane rotation to compensate for the abrupt change produced by the discontinuity. In addition, at one end of the electrical range of the circuit a voltage equivalent to a predetermined amount of vane rotation, suitably 360° rotation, is added or subtracted from the summing point as required to reposition the electrical sum to a value interior of the monitor range and displaced 360° from the end of the range. At the other end of the electrical range of the monitor, the end at which the potentiometer discontinuity is also located, no compensation is provided for the discontinuity, so that the abrupt voltage change resulting when the potentiometer tap moves across the discontinuity at this time automatically causes the stylus to be repositioned by 360°.

It is thus an object of this invention to provide a scale converter for use in a wind direction monitor.

It is another object of this invention to provide a scale converter for use with a wind direction monitor for repositioning a monitor stylus when the monitor reaches the limits of its range.

A further object of the invention is to provide a scale converter of the type described which uses a single potentiometer to perform its objective.

DESCRIPTION OF THE PREFERRED EMBODIMENT

Figure 1:
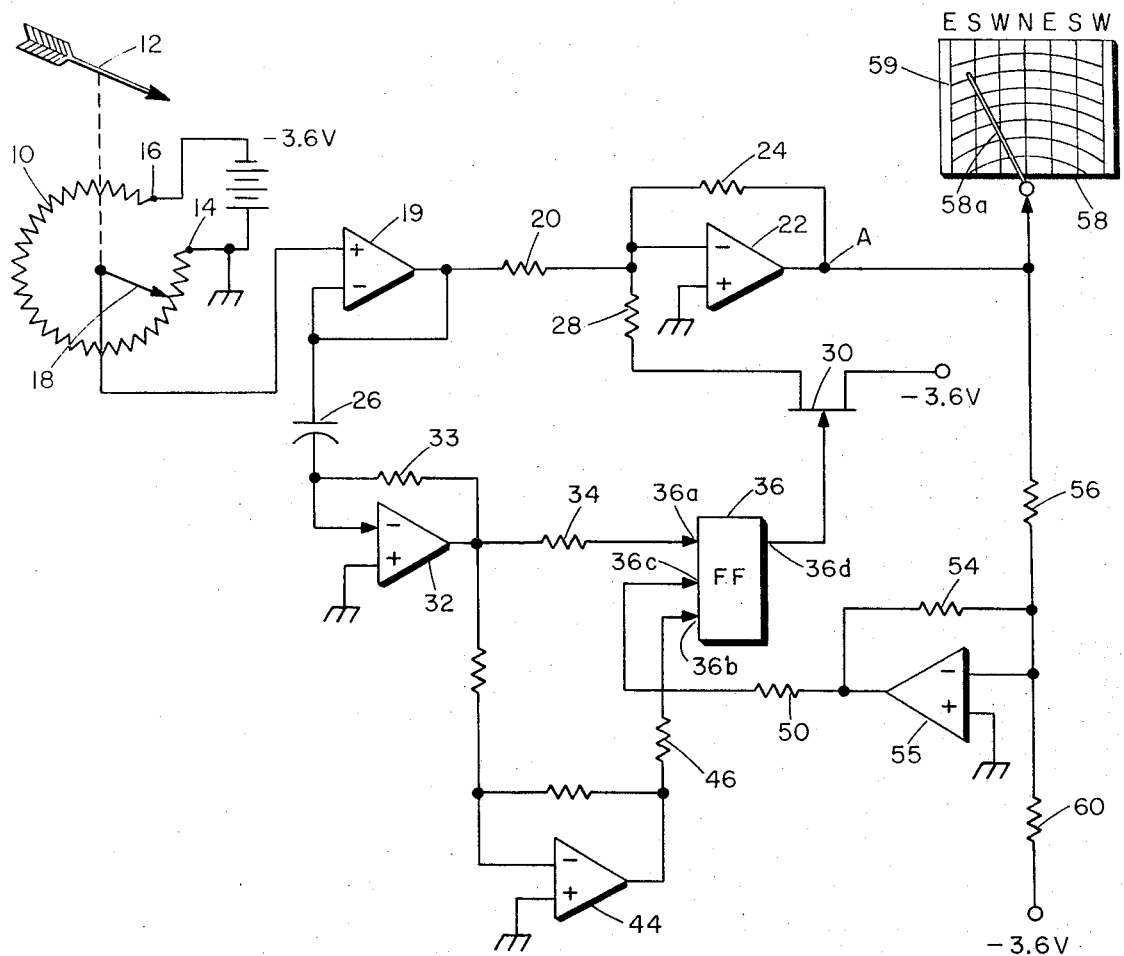
FIG. 1 is a schematic showing one particular embodiment of the invention.

Refer first to FIG. 1 where a linear, single turn potentiometer 10 has a movable tap 18 drivenly connected to wind vane 12. Potentiometer 10 includes a winding having terminals 14 and 16 across which a constant d.c. voltage is impressed so that the voltage at tap 18 is correlated to the angular position of vane 12. Although a potentiometer is shown it should be understood that any electrical device having an electrical output correlated to vane position cyclically indicating 0°–360° of vane position an having a discontinuity can be used with the invention.

In this embodiment it is assumed that 3.6 volts is impressed across potentiometer 10 between terminals 14 and 16 thereof with terminal 14 being connected to ground and terminal 16 being connected to the negative terminal of the voltage source. It is further assumed that monitor 58 is calibrated to indicate 360° rotation of vane 12 as its input voltage varies from 0 to 3.6 volts and that the total range for the monitor is from 0 to 5.4 volts, equivalent to 360° rotation plus an additional 180°. Chart 59 is calibrated with north centrally located, east at the left edge and west at the right edge. Potentiometer tap 18 is ganged directly to wind vane 12.

Tap 18 is electrically connected to unity amplifier 19 whose output is coupled into an inverter comprised of amplifier 22 and resistors 20 and 24. Resistor 20 is made equal to resistor 24 so that the voltage contribution at point A from tap 18 is equal to the inverse voltage at tap 18.

A differentiator comprised of capacitor 26, amplifier 32 and shunt resistor 33 is also connected to the output terminal of amplifier 19. The differentiator output is connected into an inverter comprised of amplifier 44. As tap 18 moves across the discontinuity of potentiometer 10 from terminal 16 to 14 so that the voltage at the tap rises by 3.6 volts, a resultant negative spike is generated at the output terminal of amplifier 32 and a positive spike is generated at the output terminal of amplifier 44. When wiper 18 moves across the discontinuity from terminal 14 to terminal 16 a positive spike is generated at the output terminal of amplifier 32 and a negative spike is generated at the output terminal of amplifier 44. The output terminal of amplifier 32 is coupled through resistor 34 to the set input terminal 36a of flip-flop 36. In like manner, the output terminal of amplifier 44 is coupled through resistor 46 to the reset input terminal 36b of flip-flop 36.

Point A is also connected to the comparator comprised of amplifier 55 having an inverting input terminal connected through resistor 56 to point A and through resistor 60 to the source of a voltage level at −3.6 volts. A shunt resistor 54 is also provided. The non-inverting input terminal of the amplifier is grounded. The amplifier output terminal is connected through resistor 50 to the toggle terminal 36c of flip-flop 36. Flip-flop 36 responds to negative going impulses at its input terminals where a negative going impulse at terminal 36a causes a signal to appear at the set output terminal 36d, a negative going impulse at terminal 36b causes an existing signal on terminal 36d to be extinguished and if no signal exists on terminal 36d at the time of the toggle a signal is so generated. Terminal 36d is connected to the gate electrode of field effect transistor 30 whose source-drain circuit is connected between one end of resistor 28 and the source of a voltage level at −3.6 volts. The other end of resistor 28 is connected to the common junction between resistors 20 and 24. In this embodiment resistor 28 is made equal to resistors 20 and 24 so that when transistor 30 is conductive a voltage contribution of 3.6 volts will appear at point A. Of course, when transistor 30 is non-conductive this contribution disappears.

In this embodiment, tap 18 is aligned with the potentiometer discontinuity when the wind is from the east. Assume now that the wind is from the north so that tap 18 picks up a voltage at −2.7 volts which is applied through amplifier 19 and the inverter so that voltage contribution at point A from the potentiometer is +2.7 volts indicating that the wind is from the north. Assume also that flip-flop 36 is reset so that transistor 30 is not conductive. If the wind should now shift sufficiently clockwise, tap 18 will move through the discontinuity from terminal 16 to terminal 14 so that the voltage at the tap increases suddenly. This voltage increase produces a negative going impulse at terminal 36a causing flip-flop 36 to generate an output at terminal 36d thus making transistor 30 conductive to apply a voltage contribution of 3.6 volts at point A. This is exactly equal to the voltage drop at point A due to the sudden increase of voltage at tap 18 so that the voltage at point A remains constant. As the wind continues to move clockwise the voltage at point A will increase until the wind is from the west when the voltage at point A will be 5.4 volts which will be equivalent to the extreme right end of the range of monitor 58. In this embodiment, the resistance of resistor 56 is one and a half times the resistance of resistor 60, thus the comparator comprised of amplifier 55 will detect the 5.4 volts at point A and produce a negative going output at its output which is applied to toggle flip-flop 36 so that the existing voltage contribution at point A from transistor 30 is extinguished. The voltage at point A thus drops by 3.6 volts which is equivalent to 360° revolution of vane 12. The stylus of the monitor thus moves to the left by 360° to the other west position. The circuit is now in its initial condition, that is, with transistor 30 non-conductive. If the wind should continue to progress clockwise, the operation of the circuit would be as already described. Assume, however, the wind moves counterclockwise so that the weather vane moves from the west position towards a south position. The voltage at point A would decrease to 0.9 volts when the wind was from the south and to 0 volts when the wind was from the east. As the wind continued to move counterclockwise tap 18 moves through the discontinuity and the voltage at tap 18 decreases from 0 to −3.6 volts. This discontinuity produces a negative impulse at the output of amplifier 44 which is applied to terminal 36b. However, since flop-flop 36 is already reset the signal at terminal 36b is now ineffective. The voltage at point A hence jumps from 0 to 3.6 volts so that stylus 58a moves to the right by 360° to the other east position. Assume that the wind continues counterclockwise until it is generally out of the north at which time the voltage at point A is 2.7 volts. Then assume that the wind moves clockwise until tap 18 again encounters the discontinuity at the east position. At that time tap 18 will move from terminal 16 to terminal 14 and the voltage at tap 18 will suddenly increase by 3.6 volts with a corresponding drop of 3.6 volts to 0 volts at point A. This results in a negative going impulse at the output of amplifier 32 which forces flip-flop 36 to the set condition so that transistor 30 is conductive and 3.6 volts continues to be generated at point A as a contribution from transistor 30. If the wind should once again move counterclockwise, tap 18 will move through the discontinuity of terminal 14 and terminal 16 so that the voltage at the tap will suddenly decrease by 3.6 volts. This drop in voltage causes a negative impulse at the output terminal of amplifier 44 which forces flip-flop 133 to the reset state to that transistor 30 becomes non-conductive and its 3.6 volt contribution at point A disappears. In this manner the voltage at point A remains at 3.6 volts, being now the contribution from potentiometer 110.

Figure 2:
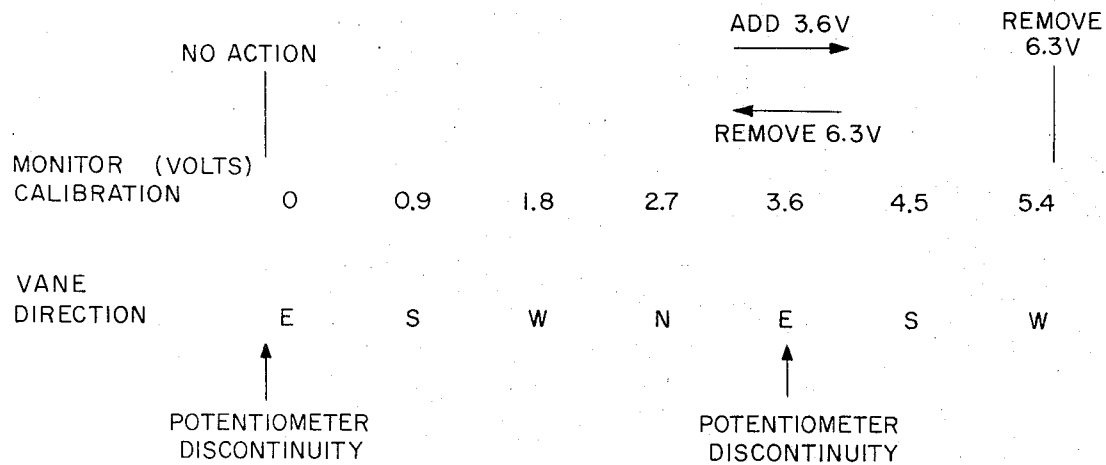
FIG. 2 is a diagram which illustrates in a simplified manner the operation of the invention as embodied in FIG. 1.

Refer now to FIG. 2 which more clearly explains the operation of the circuit of FIG. 1. It can be seen that the potentiometer discontinuity is arranged to occur at the centrally located east position on the monitor and also at the east position which comprises the left hand limit of the monitor. Referring to potentiometer 10 and movable tap 18 of FIG. 1, it can be seen that as the movable tap moves through the discontinuity in a clockwise direction the voltage at the tap suddenly rises. However, due to the action of the inverter comprised of amplifier 22 the voltage contribution from the potentiometer at point A is opposite to the voltage at the movable tap and hence the voltage contribution at point A in this situation suddenly drops. As the movable tap moves through the discontinuity in a counterclockwise direction the voltage at the tap will suddenly decrease resulting in a sudden increase in voltage at point A. Thus, and referring particularly to FIG. 2, as the movable tap moves through the discontinuity in a clockwise direction the circuit of FIG. 1 operates to add a contribution of 3.6 volts to point A to compensate for the loss of 3.6 volts contribution from the potentiometer. When the movable tap moves through the discontinuity in the counterclockwise direction the circuit operates to remove a contribution of 3.6 volts from point A to compensate for the 3.6 volts added by the potentiometer discontinuity action. In addition, when the monitor stylus reaches its extreme right limit the circuit operates to remove 3.6 volts from point A and to thus move the stylus back by 360° to the more centrally located west position. However, when the monitor stylus reaches the extreme left hand limit the circuit need not take any action since the discontinuity by itself will act to add 3.6 volts to point A, thus moving the stylus to the more centrally located east position. At that time, the movable tap will be at terminal 16 of FIG. 1. If the movable tap now moves in a counterclockwise direction the stylus will move to the left as might be expected. However, if the movable tap now moves clockwise it will pass through the discontinuity resulting in a loss of 3.6 volts at point A from the potentiometer which is exactly compensated for by the addition of 3.6 volts which is added by the other portion of the circuit.

Having shown this embodiment of the invention, other alterations and modifications should become obvious to one skilled in the art. Accordingly, the invention is to be limited only by the true scope and spirit of the appended claims.

The invention claimed is:

1. Means including a shaft rotary position monitor wherein said monitor is calibrated to indicate continuously the rotary position of said shaft from a first limit to a second limit over a range greater than 360° rotation of said shaft, comprising:

means for generating a first voltage level linearly proportional to the rotary position of said shaft and having a discontinuity;

means for generating a second signal comprising a fixed voltage level;

means for summing voltage levels applied thereto, said first voltage level being continuously applied thereto, said monitor being responsive to the sum for indicating the rotary position of said shaft;

means responsive to said shaft moving through said discontinuity in a first direction when said monitor indicates a shaft position intermediate said first and second limits for applying said second signal to said means for summing and responsive to said shaft moving through said discontinuity in an opposite direction from said first direction when said monitor indicates a shaft position intermediate said first and second limits for removing from said means for summing a second signal previously applied thereto, and additionally responsive to said monitor reaching its second limit for removing from said means for summing a second signal previously applied thereto.

2. Means as recited in claim 1 wherein said means for generating a second signal comprises means for generating said fixed voltage level equivalent to 360° rotation of said shaft.

3. Means as recited in claim 1 wherein said means for generating a first voltage lever comprises:

a source of a constant d.c. voltage; and, a 360° single turn linear potentiometer having said constant d.c. voltage impressed thereacross and a movable tap whose rotary position is correlated to the rotary position of said shaft, said voltage level linearly proportional to the rotary position of said shaft thereby appearing at said movable tap.

4. The means of claim 3 wherein the voltage level at said movable tap changes at a linear rate from a first level to a second level as said movable moves through 360° of said potentiometer in said first direction, said voltage level changing suddenly from said second level to said first level as said movable tap moves through said discontinuity in said first direction and wherein the voltage level at said movable tap changes at linear rate from said second level to said first level as said movable tap moves through 360° of said potentiometer in said opposite direction, said voltage level changing suddenly from said first level to said second level as said movable tap moves through said discontinuity in said opposite direction, said means for applying being responsive to the sudden change in said voltage level from said second level to said first level when said monitor indicates a shaft position intermediate said first and second limits for applying said second signal to said means for summing, said means for applying being additionally responsive to the sudden change in said voltage level from said first level to said second level when said monitor indicates a shaft position intermediate said first and second limits for removing from said means for summing a second signal previously applied thereto.

5. The means of claim 4 wherein said discontinuity occurs cyclically at 360° positions of said movable tap, said discontinuity occurring at least twice in a movement of said movable tap through a range equal to the range of said monitor.

6. The means of claim 5 wherein said discontinuity occurs at least once at a position where said monitor indicates a shaft position intermediate said first and second limits in a movement of said movable tap through a range equal to the range of said monitor.

7. The means of claim 5 wherein said discontinuity occurs at a position where said monitor is at its first limit.

8. The means of claim 7 wherein said second signal comprises a voltage essentially equal to said constant d.c. voltage and wherein said means for applying comprises a latching switch means connected between said means for generating a second signal and said means for summing, said switch means being latched closed when said second signal is applied to said means for summing and said switch means being latched open when said second signal is removed from said means for summing.

9. The means of claim 8 wherein said latching switch means comprises:
- a field effect transistor having a gate electrode and a source-drain circuit connected between said means for generating a second signal and said means for summing;
- a flip-flop having an output terminal connected to said gate electrode; and,
- flip-flop input means responsive to said shaft moving through said discontinuity in said first direction when said monitor indicates a shaft position intermediate said first and second limits for triggering said flip-flop to generate an output at said output terminal which establishes essentially free electrical communication in said source-drain circuit, and responsive to said shaft moving through said discontinuity in said opposite direction when said monitor indicates a shaft position intermediate said first and second limits and when said monitor reaches its second limit for triggering said flip-flop to extinguish its output whereby electrical communication in said source-drain circuit is opened.

* * * * *